United States Patent
Hull et al.

(10) Patent No.: US 8,406,739 B2
(45) Date of Patent: Mar. 26, 2013

(54) MEDIATION ROUTER

(75) Inventors: Matthew Hull, Atlanta, GA (US); Goshtasb Foroutan, Sammamish, WA (US)

(73) Assignee: AT&T Mobility II LLC, Atlanta, GA (US)

(*) Notice: Subject to any disclaimer, the term of this patent is extended or adjusted under 35 U.S.C. 154(b) by 550 days.

(21) Appl. No.: 12/273,898

(22) Filed: Nov. 19, 2008

(65) Prior Publication Data

US 2010/0124907 A1    May 20, 2010

(51) Int. Cl.
*H04L 12/58*    (2006.01)
(52) U.S. Cl. ................... 455/412.1; 455/414.1
(58) Field of Classification Search ........... 455/414.1, 455/412.1
See application file for complete search history.

(56) References Cited

U.S. PATENT DOCUMENTS

| | | | |
|---|---|---|---|
| 2001/0036224 A1* | 11/2001 | Demello et al. | 375/220 |
| 2003/0096625 A1* | 5/2003 | Lee et al. | 455/466 |
| 2006/0149624 A1* | 7/2006 | Baluja et al. | 705/14 |
| 2007/0022442 A1 | 1/2007 | Gil et al. | |
| 2007/0150347 A1* | 6/2007 | Bhamidipati et al. | 705/14 |
| 2008/0065481 A1* | 3/2008 | Immorlica et al. | 705/14 |
| 2008/0176534 A1* | 7/2008 | Kim | 455/412.1 |
| 2009/0222329 A1* | 9/2009 | Ramer et al. | 705/10 |

* cited by examiner

*Primary Examiner* — Lester Kincaid
*Assistant Examiner* — Isaak R Jama
(74) *Attorney, Agent, or Firm* — Turocy & Watson, LLP

(57) ABSTRACT

A system and methodology that can dynamically select advertisement vendors in response to a request from a wireless communication device is provided. The system employ a mediation router to receive an ad request from a portal interfaced with a wireless device. Specifically, the mediation router analyzes the request and dynamically selects an ad vendor to service the request, based in part on the analysis. The selected ad vendor supplies the ad and the mediation router ensures that the portal receives the ad. The mediation router selects an ad vendor in a variety of ways including, but not limited to, business decision rules or artificial intelligence and/or a combination thereof. The mediation router further employs customer profiles that help vendors target advertisements to specific consumers and wireless devices.

20 Claims, 13 Drawing Sheets

MEDIATION ROUTER

TECHNICAL FIELD

The subject innovation relates to wireless communications and, more particularly, to dynamically determining a vendor that can supply an advertisement, which can be provided to a wireless communication device.

BACKGROUND

Mobile advertising, advertising through wireless phones and other mobile devices, is a new field for both wireless carriers and advertisers. Similar in form to Internet advertisements, mobile advertisements can be rendered in several varied forms, including banner ads at the top or bottom of requested pages, tagged ads, and full-page ads. Unique to mobile advertisements are SMS ads, ads within mobile games and videos, and ads that appear while a requested item of mobile content is loading. To reach all types of mobile devices, mobile advertisements can take many forms, including graphic, text-based, audio or video. With mobile devices becoming more prevalent throughout society, many advertisers have rushed into this media. Mobile advertising can provide brands, agencies, marketers, and/or vendors an efficient means to connect with consumers by directly advertising on their mobile devices.

Typically, several vendors are available to sell and service such advertisements. Mobile providers can establish a contract for a particular period of time, for example, 2-3 years, with one such vendor to supply and service their mobile advertisements. During the contract period, the selected vendor can automatically provide one or more advertisements to mobile users serviced by the mobile provider. However, if the chosen vendor underperforms, the provider is stuck with the low performing vendor for the duration of the contract. This type of conventional mobile advertising system, where providers are contractually stuck with underperforming advertisers, is both inefficient and cost prohibitive.

In addition, conventional systems employ a tedious process to add/remove advertisement vendors and/or inventory portals from the mobile network, requiring each new vendor or portal to connect individually to existing portals or vendors. For example, when changing vendors, providers must connect each new vendor with each portal of the mobile network such that the new vendor can access the network's inventory. This makes changing vendors or portals and/or adding new vendors or portals a complex, costly and time-consuming process.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The subject matter disclosed and claimed herein, in one aspect thereof, comprises a system for dynamically delivering a mobile advertisement via a mediation router from a selected vendor that can supply an advertisement to a portal. The mediation router can function as a single, central node that interfaces between one or more portals and one or more vendors. Moreover, the mediation router can facilitate communication between a plurality of portals that request ads and a plurality of vendors that supply ads. One of a plurality of portals can send a request for an advertisement that can be displayed on a mobile device associated with the portal.

One aspect of the subject innovation comprises a request receiving component that receives ad requests from one or more portals. Typically, the request can include information associated with the mobile device and/or the mobile device user. Further, the system includes an analysis component that can analyze the request to determine the desired characteristics of the advertisement with regard to any associated device characteristic or user profile information. According to this analysis, the analysis component can select one of a plurality of available vendors to supply an appropriate advertisement that can correspond to the portal's device characteristics and/or user profile information and forwards the request to the selected vendor. In addition, a delivery component is employed to receive the ad from the selected vendor and forward the ad to the requesting portal. According to an aspect, when the vendor delivers the advertisement, the delivery component can examine the advertisement to ensure that it meets the portal's specifications. If the advertisement fits the portal's specifications, the delivery component can supply the advertisement to the portal.

In accordance with another aspect of the system, the mediation router can select one or more secondary vendors to provide a backfill advertisement when the originally chosen vendor either fails to supply an advertisement within a certain time or supplies a non-conforming advertisement. According to an aspect, the mediation router can monitor, capture and log events that occur during every aspect of a request: from receipt of the request from the portal until delivery of the appropriate, conforming advertisement to the portal. The mediation router can generate reports based the data the mediation router receives from monitoring, capturing and logging events. Further, the mediation router can establish a feedback loop system for both portals and vendors, for example, to establish whether an advertisement has been delivered.

In another aspect, the mediation router can ensure that portals receive targeted advertisements that correspond to device characteristics and/or user profile information (e.g., location, demographic, purchasing history). Additionally, the mediation router can employ one or more decision rules to determine which vendor to select for advertisement delivery to a portal. Most often, the decision rules can include whether a vendor has pre-purchased the rights to deliver a certain number of advertisements, whether the advertisement spot is subject to a dynamic auction or whether the vendor satisfies one or more business rules. The varied rules can be used alone or in combination and can be predefined during initialization or generated and/or modified at runtime (e.g. by a mobile service provider). Additionally, the mediation router can also employ artificial intelligence techniques to determine which vendor should receive the request.

Yet another aspect of the disclosed subject matter relates to a method that can be employed for delivering a mobile advertisement from a dynamically selected ad vendor. The method can comprise receiving a request for a mobile advertisement. Further, the received request can be analyzed based in part on one or more decision rules and/or device and/or user profile data. A vendor can be chosen to supply the advertisement in compliance with the analysis. Further, a request can be sent to the selected vendor for an advertisement. If the chosen vendor does not respond with an advertisement within a certain time, a request can be sent to one or more secondary vendors. In the event the primary vendor does not provide an advertisement within a defined wait time, then a secondary vendor can send an ad in the primary vendor's place. The received ad can then be forwarded to the requester.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
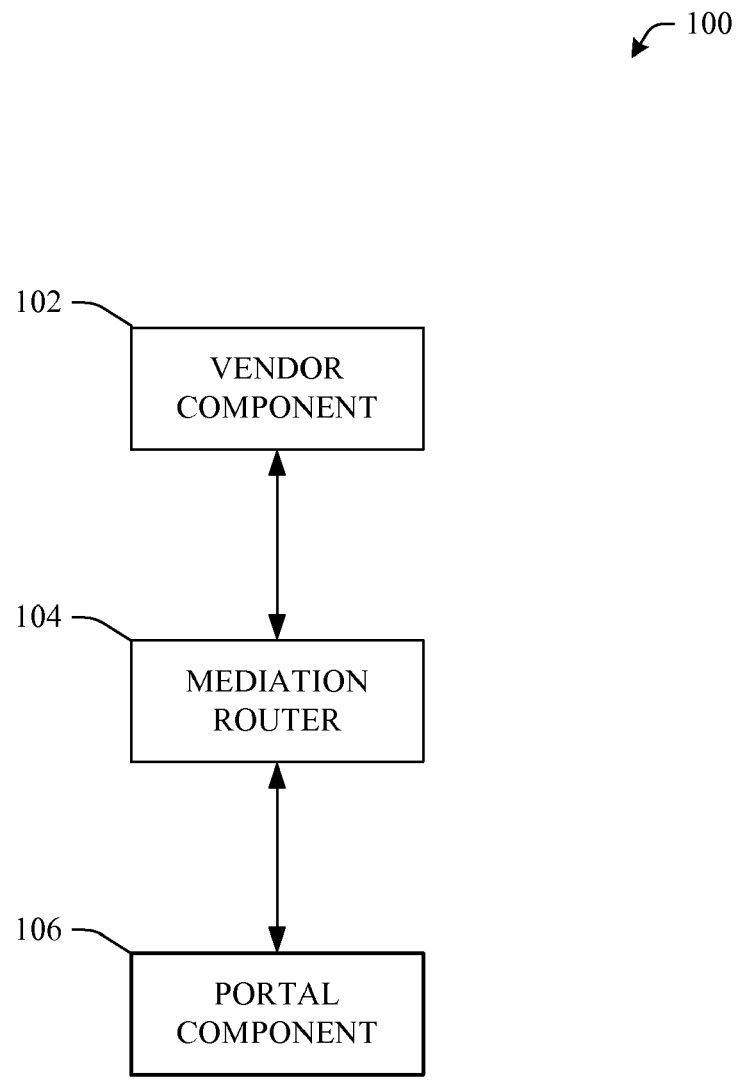
FIG. 1 illustrates a block diagram of an example system that can deliver advertisements to a mobile device in accordance with an aspect of the disclosed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," "interface," "router," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components. Further, terms "advertisement", "ad", and the like are used interchangeably herein and are typically intended to refer to a public promotion of one or more products or services. Additionally, terms "provider," "mobile service provider," "mobile provider" and the like are used interchangeably herein and are typically intended to refer to a company that offers transmission services to users of wireless devices. Further, terms "wireless device," "mobile device," "user device," "device," and the like are used interchangeably herein and are typically intended to refer to most any electronic device that transmits data or information through radio or electromagnetic waves.

Furthermore, the claimed subject matter may be implemented as a method, apparatus, or article of manufacture utilizing standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Conventional systems distribute advertisements utilizing a single ad vendor that can sell and service a provider's mobile advertisements. Providers employing conventional systems can select an ad vendor from the many vendors on the market and enter a contract for a certain period of time (e.g., 2-3 years). The ad vendor can automatically supply the provider's users with one or more advertisements upon request. These conventional systems where providers contract with a single ad vendor are both inefficient and cost prohibitive because providers can be contractually obligated to stick with a vendor that performs below expectations for the duration of the contract.

Additionally, conventional systems are limited in the way they add/remove ad vendors and/or inventory portals from the mobile network. Typically, conventional systems employ a tedious process in which each vendor must be disconnected/connected to each portal and similarly, each portal must be disconnected/connected to each vendor. Thus, adding or removing vendors or portals often causes disruption of service or network shutdown. This is a complex, costly and time-consuming process since network changes are typically performed on an individual basis and each vendor or portal must be connected to every element of the network separately.

Embodiments presented herein employ a mediation router that can facilitate dynamic delivery of advertisements to one or more mobile devices. The mediation router can be connected as a single, central node of a hub-and-spoke network to connect portals and vendors and facilitate communications between the portals and vendors. Specifically, the mediation router can choose an appropriate vendor based on selection criteria, including, but not limited to, vendor performance, user preferences, historical statistics, etc. and, thus, enable vendors to supply mobile users with advertisements. The mediation router's role as a central node can eliminate the costly, time-consuming process of individually adding/removing vendors and portals from the network by disconnecting/connecting to each element of the network.

Referring initially to FIG. 1, illustrated is an example system 100 that can provide advertisements to mobile devices, according to an aspect of the subject specification. In particular, the system 100 can connect an ad vendor component 102 to a portal component 106 via a mediation router 104 to supply an advertisement to a mobile device (not shown) associated with the portal component 106. As an example, a mobile device can include, but is not limited to, a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem, a media player, a media recorder, a camera, etc., or a combination thereof.

The mediation router 104 can be a non-consumer facing middleware platform, which can connect the portal component 106 with the vendor component 102. Functions of the mediation router 104 include, but are not limited to, receiving and transmitting requests for an advertisement, managing ad distribution, capturing user click-through statistics, and/or providing internal reporting. Typically, the mediation router 104 can analyze a received request for an advertisement and dynamically select a vendor to service the request and supply the advertisement based in part on the analysis The mobile device (not shown) can be linked to the system 100 via the portal component 106, which can include one or more mobile device applications that receive ads. For example, the portal component 106 can include, but is not limited to, games, web browsers, storefronts and media portals. According to an aspect, when a mobile device application requests an advertisement via the portal component 106, the portal component 106 can send the request to the mediation router 104. The request can include, for example, information about the user (e.g., location) or the mobile device (e.g., type of ad formats supported by the device, ad location on the device, etc). The portal component 106 can receive the requested ad from the mediation router 104 and display the ad on a user interface in a predetermined location on the mobile device (e.g. on the display screen).

According to an aspect, the vendor component 102 can be employed to supply mobile advertisements to the system 100. The vendor component 102 can include, but is not limited to, one or more ad servers or suppliers (vendors), for example, JumpTap, Yahoo!, Third Screen Media, Millennia Media, Quatro, or Admob. The vendor component 102 can receive a request for an advertisement from the mediation router 104 and supply an advertisement that can be targeted to the requesting user or portal component 106 via the mediation router 104. By employing the mediation router 104, mobile providers, through portal component 106, can utilize the vendor component 102 to supply their mobile advertising requirements.

In one embodiment, the mediation router 104 can receive a request for a mobile advertisement from the portal component 106. The portal component 106 can comprise of multiple portals (not shown) available to system 100. The request can include, for example, information regarding a location where the ad can be displayed on a user interface and/or user demographics for ad targeting. The mediation router 104 can receive, process and analyze the request. Further, the mediation router 104 can dynamically select an ad vendor (not shown) from the vendor component 102 that can be employed to supply an advertisement based in part on the analysis. The mediation router 104 then can communicate the request to the vendor component 102. In response to the request, the vendor component 102 can send an ad to the mediation router 104. In one example, the vendor component 102 can employ most any criterion to select an ad, such as, but not limited to, yield optimization. In another example, the vendor component 102 can deploy device-targeting capabilities to select an appropriate ad (based on image, text, and device characteristics) so the rendered ad does not negatively affect mobile device user experience. For example, an ad's landing page shall not contain content that is not supported by the target device. The mediation router 104 can route the ad to the portal component 106 that can then display the ad on the mobile device.

In another embodiment, the mediation router 104 can integrate with new vendors or portals without requiring any downtime of service and without impacting currently integrated vendors or portals. The mediation router 104 can also remove vendors or portals from the system 100 without requiring any downtime of service and without affecting currently integrated vendors or portals.

Typically, the mediation router 104 can send a request for an ad to the vendor component 102. Moreover, the vendor component 102 can consist of multiple vendors (not shown) available to system 100. In one aspect, the mediation router 104 can determine a primary vendor in the vendor component 102 that can supply the ad and, in addition, determine one or more secondary vendors in the vendor component 102 that can be employed to supply the ad in case the primary vendor in the vendor component 102 does not provide an ad based on predefined criteria. In one aspect, the mediation router 104 can send a request to the one or more secondary vendors in parallel with the request sent for the primary vendor. As an example, the secondary vendor can supply an ad when the primary vendor cannot supply an ad within a certain time. Thus, when a predefined maximum wait-time for an ad is reached, the primary vendor does not return an ad, or the ad supplied by the primary vendor does not adhere to predefined rules, the secondary vendor, which receives the ad request in parallel, can supply a backfill ad. Accordingly, the mediation router 104 can provide the requesting portal component 106 with the backfill ad.

For example, if Primary Vendor A receives an ad request, it has a specified amount of time (e.g., t_1) to provide an ad before a backfill request can be sent in parallel to Secondary Vendor B. If Primary Vendor A fails supply an ad within the maximum wait time (e.g. t_max) or supplies a noncompliant ad within the maximum wait time, then Secondary Vendor B can supply a backfill advertisement. This process can be repeated with other secondary vendors in the vendor component 102 in parallel until the mediation router 104 receives an ad.

The parallel backfill technique that can be employed by the mediation router 104 is an improvement over conventional systems, which employ a serial backfilling technique. In such traditional systems, mobile devices can request an ad from a first vendor. The device then waits for the first vendor to send an ad. When the vendor does not send an ad by a maximum wait time, the device sends a request to a second vendor and waits for the same time. The serial process repeats until a vendor sends an ad. This process is time and resource consuming, creating a back-up through a cumbersome system. The mediation router 104 can employ a parallel backfill technique, which can decrease time and costs. It can be appreciated that the mediation router 104 is not limited to parallel backfill; for example, the mediation router 104 can alternatively employ serial or combination parallel and serial backfilling techniques.

Figure 2:
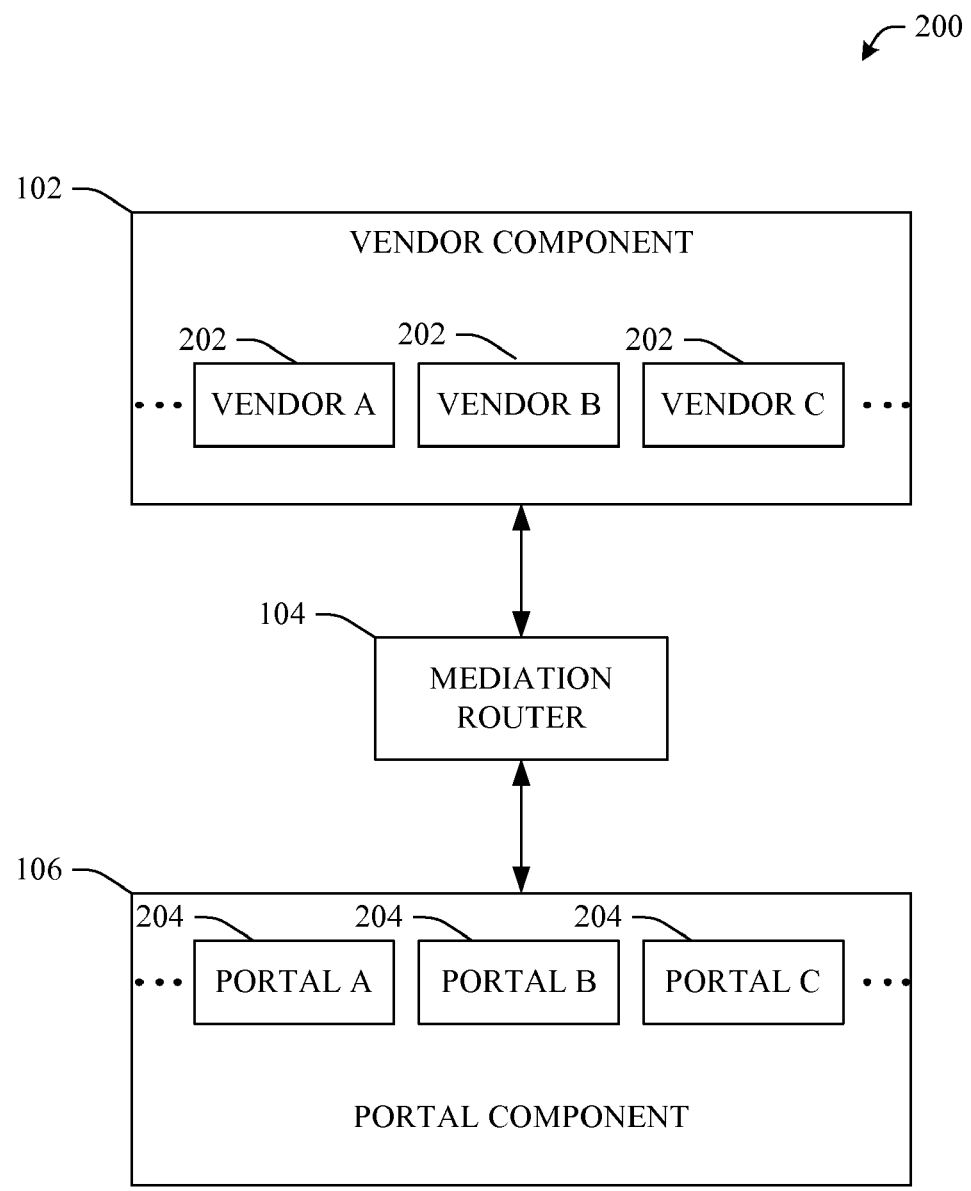
FIG. 2 illustrates a block diagram of a hub-and-spoke network that can employ a single node to select one of a plurality of vendors that can deliver an advertisement to a mobile device in accordance with an aspect of the disclosed subject matter.

Referring now to FIG. 2, illustrated is an example hub-and-spoke network 200, which can employ a mediation router 104 as the central node, according to an aspect of the subject disclosure. In one embodiment, the network 200 can link a vendor component 102, which can communicate through a mediation router 104, to a portal component 106. The mediation router 104 can be employed as the network's central node to efficiently provide advertisements from the vendor component 102 to the portal component 106. In particular, the mediation router 104 can dynamically select a vendor 202 within the vendor component 102 to service a request based on an analysis of the request, predefined rules and/or preferences.

Typically, the portal component 106 can be comprised of a plurality of portals 204 that receive ads (e.g., games, web browsers, storefronts or media portals). The portals 204 each can request ads specific to an application on a mobile device. For example, a Tetris game can request for an advertisement that can be displayed on a window that appears when a user opens the game, or a Web browser can request a banner advertisement to appear in a box of a certain size below a Web page. According to an example, each portal 204 can send a set of predefined rules along with, or prior to, sending an ad request to the mediation router 104. Moreover, the predefined rules can include, for example, the portal's 204 preferences to receive an ad, such as, ad size, format, and/or filter specifications, like parental controls.

The network 200 can further employ the mediation router 104 as its central node, such that the mediation router 104 can facilitate communication between portals 204 and vendors 202. Through its role as the central node, in one embodiment, the mediation router 104 can receive ad requests from portals 204 included in the portal component 106. The mediation router 104 can further manage ad distribution between a plurality of vendors 202 included in the vendor component 102.

In one embodiment, the mediation router 104 can receive an ad request from a portal 204 within the portal component 106. After receiving the ad request, the mediation router 104 can analyze the request, for example, determining a profile of a user of the requesting portal 204 (e.g., age, time of request or location of user) or determining one or more specifications of the requesting portal 204 (e.g., format, shape or size) based in part on a subscriber-id (SUB_ID) received in the request. The mediation router 104 can employ the analysis to decide which of the plurality of ad vendors 202 to send the request for an ad to. As described supra, the mediation router 104 can determine one or more ad vendors 202 that can be sent ad requests in serial, parallel or combination of serial and parallel fashion. Further, the mediation router 104 can forward the ad request to the selected vendor 202 along with profile data, device data, and/or user preferences associated with the portal 204 that sent the request. The vendor 202 can utilize the data and/or preferences to select an optimal ad for the portal 204. Further, according to one aspect, the mediation router 104 can also check if the ad supplied by the selected vendor 202 adheres to preferences and/or filters set by the portal 204 that were sent to the vendor 202. This embodiment of the mediation router 104 can provide a check and balance functionality, which can eliminate a weakness of conventional systems. Thereby, in one aspect, underperforming vendors 202 can have their ad requests reduced or even can be removed from the network 200 altogether.

In a further embodiment, the mediation router 104 can provide internal reporting, as well as service level monitoring for network 200. Through this capability, a network user, such as a network administrator, can monitor, for example, the performance of vendors 202 and can generate and/or modify predefined user data that can be utilized by the mediation router 104 in vendor 202 selection. For example, the network 200 administrator can analyze a performance report provided by the mediation router 104 and determine that a vendor 202 with a high performance can be selected by the mediation router 104 to receive ad requests more often. According to an aspect, the mediation router acts 104 as a central node between the portal component 106, containing multiple portals 204, and the vendor component 102, containing multiple vendors 202. This allows the mediation router 104, upon receiving a request for an ad from a portal 204, to dynamically select from a plurality of vendors 202 to provide the ad to the portal 204.

In another embodiment, the mediation router 104, in its role as the network's central node, can integrate with one or more new portals 204 or vendors 202 and easily connect the new component to the entire network 200. Similarly, the mediation router 104 can easily remove portals 204 and vendors 202 from the network 200. The integration or removal can be seamless, such that service is not interrupted and/or performance of disparate portals 204 or vendors 202 is not affected. In this manner, portals 204 and vendors 202 can be added/removed from the network 200 without much time, overhead or expense.

According to an aspect, the vendor component 102 can comprise a plurality of vendors 202 that provide the ads, wherein, an individual vendor 202 can select an appropriate advertisement in response to a request from the mediation router 104 and send the selected advertisement to the mediation router 104. Moreover, a vendor 202 can receive a request for an advertisement along with one or more parameters (e.g., the user's age, the time of day the request is received, and other profile information, as well as the size ad requested) and can select an appropriate advertisement based on the received parameters. For example, if a forty-nine year old male user opens a portal 204 (e.g., a web browser) on his mobile phone, the selected vendor 202 can examine its advertisement queue and send an ad that corresponds to the user's profile information and the portal's 204 specifications. In this example, the vendor 202 can send an advertisement for Old Spice deodorant, which can be targeted to middle-aged men, as a banner ad, which can fit the web browser's specification.

Figure 3:
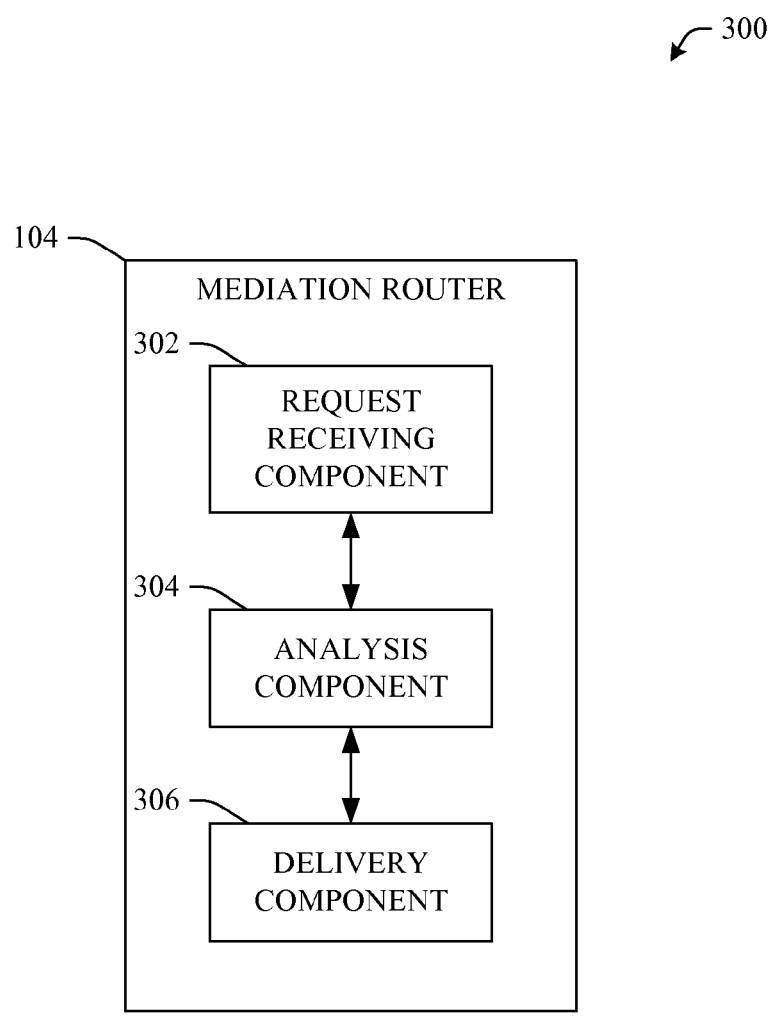
FIG. 3 illustrates a schematic block diagram of a mediation router that can receive requests for advertisements, analyze the requests and choose a vendor to provide advertisements based on the analysis of the requests in accordance with an aspect of the disclosed subject matter.

Referring now to FIG. 3, illustrated is a schematic block diagram 300 of a mediation router 104 in accordance with an aspect of the subject disclosure. A mediation router 104 can include a request receiving component 302 that can be employed to receive requests for advertisements from one or more portals (204 in FIG. 2). Further, the mediation router 104 can employ an analysis component 304 that can analyze the request and determine a vendor (202 in FIG. 2) that can provide the requested advertisement. In addition, the mediation router 104 can include a delivery component 306 that can receive an ad from a vendor (202 in FIG. 2) and forward the ad to the one or more portals (204 in FIG. 2). It can be appreciated that the vendor component 102 (and individual vendors 202) and the portal component 106 (and individual portals 204) can each include their respective functionality, as more fully described herein, for example, with regard to systems 100, 200.

In one embodiment, the request receiving component 302 can receive a request from a portal (204 in FIG. 2) for an advertisement along with zero or more additional parameters. Moreover, the request receiving component 302 can receive parameters along with the ad request or in an initialization procedure that can be performed prior to receiving requests. In one example, the request receiving component 302 can accept parameters (e.g., parental control filter status, device or user preferences) associated with a particular portal (204 in FIG. 2) and/or mobile device. Further, the request receiving component 302 can store the received parameters and can utilize the stored parameters each time a request is received from the particular portal (204 in FIG. 2). In one aspect, the request receiving component 302 can receive a subscriber identification (SUB_ID) associated with each request. Based on the SUB_ID, the mediation router 104 can determine predefined preferences associated with the requestor.

Typically, the analysis component 304, can select one or more vendors (202 in FIG. 2) that can be employed to service the request received by the request receiving component 302. The analysis component 304 can employ most any selection technique, including, but not limited to, business rules, user preferences and/or machine learning techniques. According to one aspect, the analysis component 304 can employ a selection technique that can increase, maximize or optimize profits. Further, on selection of a suitable vendor (202 in FIG. 2), the analysis component 304 can forward the request to the selected vendor (202 in FIG. 2) along with data associated with user and/or device preferences. Moreover, the vendor (202 in FIG. 2) can employ the data to select an appropriate advertisement. In one embodiment, the analysis component 304 can select one or more secondary vendors (202 in FIG. 2) based on the analysis and forward the request to the secondary vendors (202 in FIG. 2), to supply a backfill ad (as described supra).

The delivery component 306 can be employed to receive an advertisement from the vendor (202 in FIG. 2), verify that the advertisement meets the predefined criteria specified by the parameters associated with the portal (204 in FIG. 2) and forward the advertisement to the requesting portal (204 in FIG. 2) upon verification. For example, in response to an ad request from a portal (204 in FIG. 2) associated with an active parental control filter, the mediation router 104 can ensure that advertisements delivered to the portal (204 in FIG. 2) do not contain offensive content.

Figure 4:
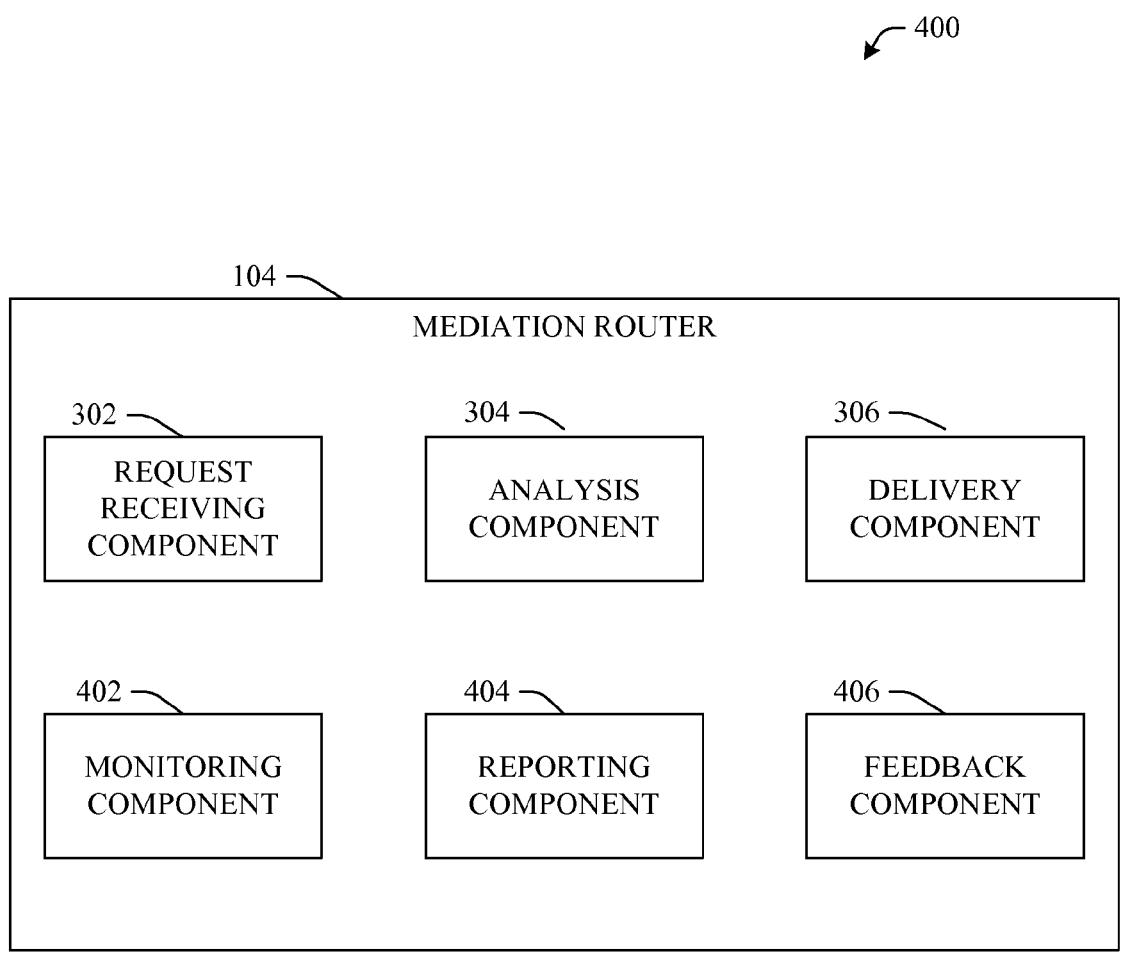
FIG. 4 illustrates a schematic block diagram of a mediation router that can monitor requests for advertisements, create reports and receive feedback from both the portal component and the vendor component in accordance with an aspect of the disclosed subject matter.

Referring now to FIG. 4, illustrated is a schematic block diagram 400 of a mediation router 104 that can monitor requests for advertisements, create reports and receive feedback from both the portal component (106 in FIG. 1) and the vendor component (102 in FIG. 1) in accordance with an aspect of the disclosed subject matter. Specifically, the mediation router 104 can monitor, capture and log events from the time it receives an ad request from a portal (204 in FIG. 2) (e.g. by employing a request receiving component 302) through the time it analyzes the request (e.g. by employing an analysis component 304) and delivers the request to a vendor (202 in FIG. 2) (e.g. by employing the delivery component 306) until it receives an ad from the chosen vendor (202 in FIG. 2) (e.g. by employing a request receiving component 302) and delivers the ad to the requesting portal (204 in FIG. 2) (e.g. by employing the delivery component 306). It can be appreciated that the request receiving component 302, analysis component 304, and the delivery component 306 can each include their respective functionality, as more fully described herein, for example, with regard to system 300. Further, it can be appreciated that the vendor component 102 (and individual vendors 202) and the portal component 106 (and individual portals 204) can each include their respective functionality, as more fully described herein, for example, with regard to systems 100, 200.

As illustrated in FIG. 4, the mediation router 104 can additionally comprise a monitoring component 402, a reporting component 404 and/or a feedback component 406. According to an aspect, the monitoring component 402 can be employed to monitor ad requests and delivery and log unsuccessful (e.g., vendor (202 in FIG. 2) time out events or vendor (202 in FIG. 2) data-related errors) and/or successful (e.g., average vendor (202 in FIG. 2) response time) transactions. The mediation router 104 can produce a variety of reports regarding these logs by employing the reporting component 404. The logs and reports generated by the reporting component 404 can, for example, allow mobile providers (e.g. a network administrator) to monitor the availability or latency of vendors (202 in FIG. 2) and, thereby, determine which vendors (202 in FIG. 2) are the most cost effective.

In one example, the reporting component 404 can produce hourly, daily, weekly or monthly reports, in addition to reports for ad hoc periods, for the actual ad distribution across vendors (202 in FIG. 2) at the page (ad spot) level (not shown), or per portal (204 in FIG. 2) accessed via a web interface. The time period can be customizable with standard periods established for weeks, months, quarters, and years. The reports can, for example, facilitate compliance monitoring. According to an aspect, the reporting component 404 can provide the ability to reconcile third party audits with system provider reporting. Further, the reporting component 404 can provide ability for payment and revenue transfer processes to be auditable, sustainable and compliant with security controls. The reports generated by the reporting component 404 can be available to an authorized administrator via a secure web interface tool. Additionally or alternately, the reports can be automatically analyzed by applying machine learning techniques.

In one aspect, the reporting component 404 can produce reports based on contextual targeting ad traffic. Further, the reporting component 404 can generate a report that compares the performance (click-through rate) of users with targeting data to the performance of those users without targeting data. These reports can be generated, for example, at an ad spot level or for a service provider's entire site hierarchy. In addition, a comparison between customers with various types of targeting data (for example, gender vs. age) can also be performed.

In another embodiment, the feedback component 406 can interface with both portals (204 in FIG. 2) and vendors (202 in FIG. 2) for loop-back acknowledgement. A portal (204 in FIG. 2) configured for loop-back acknowledgement can send, for example, acknowledgement that the portal (204 in FIG. 2) has received the ad delivered and/or whether the user clicked the ad. Vendors (202 in FIG. 2) configured for loop-back acknowledgement can receive, for example, an acknowledgement indicating that the mediation router 104 has delivered the ad to a portal (204 in FIG. 2). In particular, the feedback component 406 can receive acknowledgements from configured portals (204 in FIG. 2) and can send acknowledgements to vendors (202 in FIG. 2). The reporting component 404 can also produce reports based on loop-back acknowledgements.

For example, during portal configuration, the mediation router 104 can configure portals (204 in FIG. 2) that support loop-back acknowledgement functionality. When a portal (204 in FIG. 2) supports loop-back functionality, then the portal (204 in FIG. 2) can make acknowledgement calls to the feedback component 406 after rendering the delivered ad to the device. The feedback component 406 can receive and coordinate this loop-back acknowledgement. Not all portals (204 FIG. 2) and/or vendors (202 FIG. 2) possess loop-back acknowledgement capabilities, so the mediation router 104 can turn on/off support for the loop-back acknowledgement mechanism via the feedback component 406 for each portal (204 FIG. 2) or vendor (202 FIG. 2). This can be accomplished without system downtime or development.

For portals (204 in FIG. 2) with loop-back acknowledgement capability, the feedback component 406 can consider an ad as delivered only when an acknowledgement is received by the feedback component 406. For a portal (204 in FIG. 2) without loop-back acknowledgement capability, the feedback component 406 can consider an ad as delivered when the ad is sent to the portal (204 in FIG. 2) without waiting for an acknowledgement. Further, for portals (204 in FIG. 2) that can support loop-back acknowledgement, the mediation router 104 can send an acknowledgement through its feedback component 406 to the vendor (202 in FIG. 2) that the ad is delivered when an acknowledgement is received from the portal (204 in FIG. 2). For portals (204 in FIG. 2) without loop-back acknowledgement capability, the feedback component 406 can send an acknowledgement to the vendor (202 in FIG. 2) that the ad is delivered after it sends the ad to the portal (204 in FIG. 2).

In a further embodiment, when a backfill ad (as described supra) is sent to the requesting portal (204 in FIG. 2), the feedback component 406 can acknowledge both the primary and secondary vendors (202 in FIG. 2). In one aspect, the mediation router 104 can choose only vendors (202 in FIG. 2) with loop-back acknowledgement capabilities as secondary vendors (202 in FIG. 2) because of reporting and/or allocation complexity. The monitoring component 402 can capture pertinent information from the backfill event for reporting purposes, including, but not limited to, date and time of the backfill request, vendor (202 in FIG. 2), ad classification requested, priority of the second vendor (202 in FIG. 2) request, whether an ad was returned, and date and time backfill ad was received.

For example, the feedback component 406 can send an acknowledgement to the secondary vendor (202 in FIG. 2) based in part on the backfill event information. In the same case, when a backfill ad is sent to the requesting portal (204 in FIG. 2), the feedback component 406 can capture the backfill event and count no-ad delivered from the primary vendor (202 in FIG. 2) against the primary vendor (202 in FIG. 2). Additionally, the secondary vendor (202 in FIG. 2) will not have the backfill ad counted against its quota of ads to deliver. Further, the reporting component 404 can clearly distinguish between backfill transactions and allocated transactions. To avoid double counting and punishing the secondary vendor (202 in FIG. 2) for supplying a backfill advertisement, the mediation router 104 can only backfill from secondary vendors (202 in FIG. 2) that can support loop-back acknowledgement. Since a vendor (202 in FIG. 2) can participate in both primary and secondary ad requests, a mediation router 104 can send an optional parameter in the call to the vendor (202 in FIG. 2) differentiating backfill ad requests.

Figure 5:
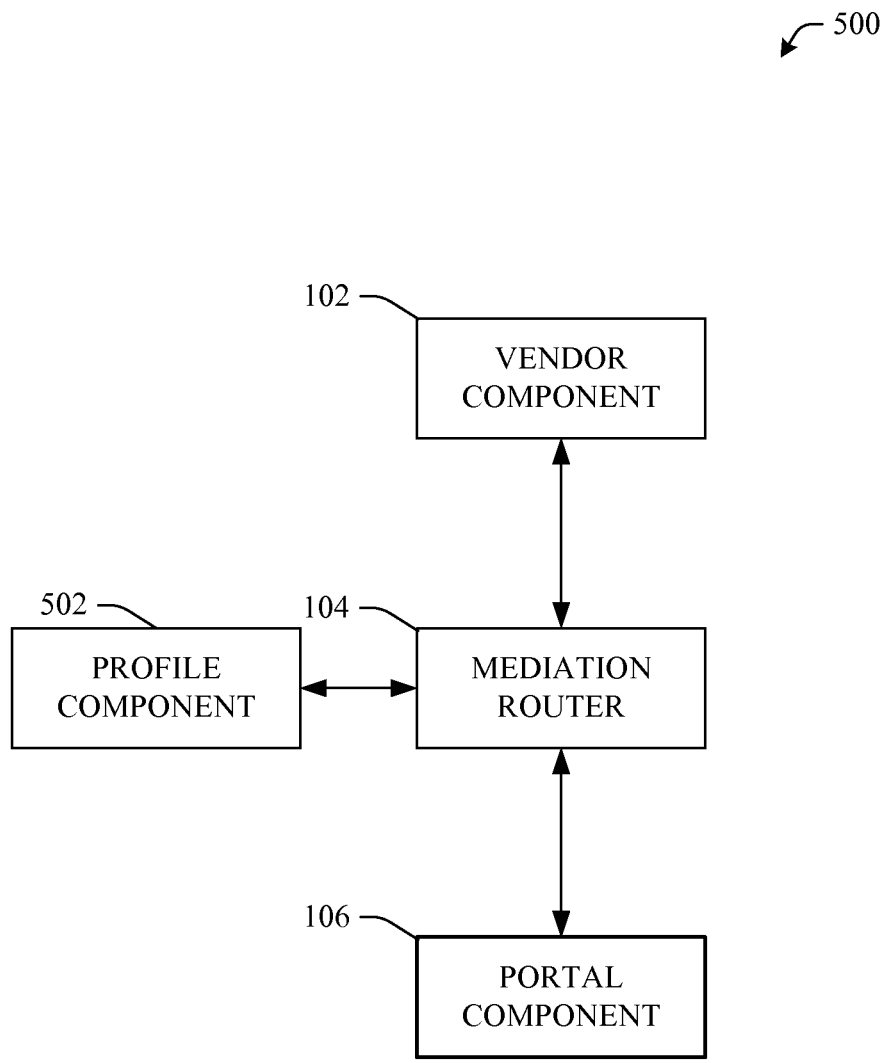
FIG. 5 illustrates an example system that can employ a single node to select one of a plurality of vendors to deliver an advertisement to a mobile device based in part on profile data unique to a specific user in accordance with an aspect of the disclosed subject matter.

Referring now to FIG. 5, illustrated is an example system 500 that can employ a single node mediation router 104 to select one or more vendors (202 in FIG. 2) from a vendor component 102 to deliver an advertisement to a mobile device through a portal component 106 based on part on profile data unique to a specific user. It can be appreciated that the vendor component 102 (and individual vendors 202), mediation router 104, and the portal component 106 (and individual portals 204) can each include their respective functionality, as more fully described herein, for example, with regard to systems 100, 200.

System 500 can include a profile component 502 that can be employed to store data associated with a particular mobile device user, including, but not limited to, device data and user data. The stored data can help the mediation router 104 in selection of the one or more vendors (202 in FIG. 2) from the vendor component 102 and/or ads. In one embodiment, the profile component 502 can include device data associated with mobile device preferences. Moreover, each device (not shown) associated with the portal component 106 can have different preferences associated with different types of advertisements. For example, some devices can have performance difficulties when displaying graphical ads. The mediation router 104, to protect the quality of the user experience, can receive device information from the profile component 502 and analyze the device information. In one aspect, when the profile component 502 indicates that the device is one that has performance difficulties displaying graphical ads, the mediation router 104 can request, for example, a text-only ad from a vendor component 102. The mediation router 104 can utilize device data to further protect a user's experience by employing targeting capabilities so that the vendor (202 in FIG. 2) can select an appropriate and/or optimal ad based on, for example, image, text or device characteristics so the rendered ad does not negatively affect the customer's experience. For example, by employing unique tags, the mediation router 104 can ensure that the vendor component 102 will not send an ad with a landing page that has content for a device when the device cannot support the content (e.g., graphics).

In another embodiment, the mediation router 104 can target advertisements based on a device's technical capabilities as provided by the profile component 502. For example, targeting can be based on video streaming support, video download support, maximum supported download size, ringtone type support, wallpaper type support, supported game types or supported application types. In addition, the mediation router 104 can target advertisements based on data associated with the user as provided by the profile component 502. The user data can include, but is not limited to, geographical data, personal data, behavioral data, etc.

It can be appreciated that the profile component 502 described herein can include volatile memory or nonvolatile memory, or can include both volatile and nonvolatile memory to store profile information. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g. data stores, databases) of the subject system and method is intended to comprise, without being limited to, these and any other suitable types of memory.

Figure 6:
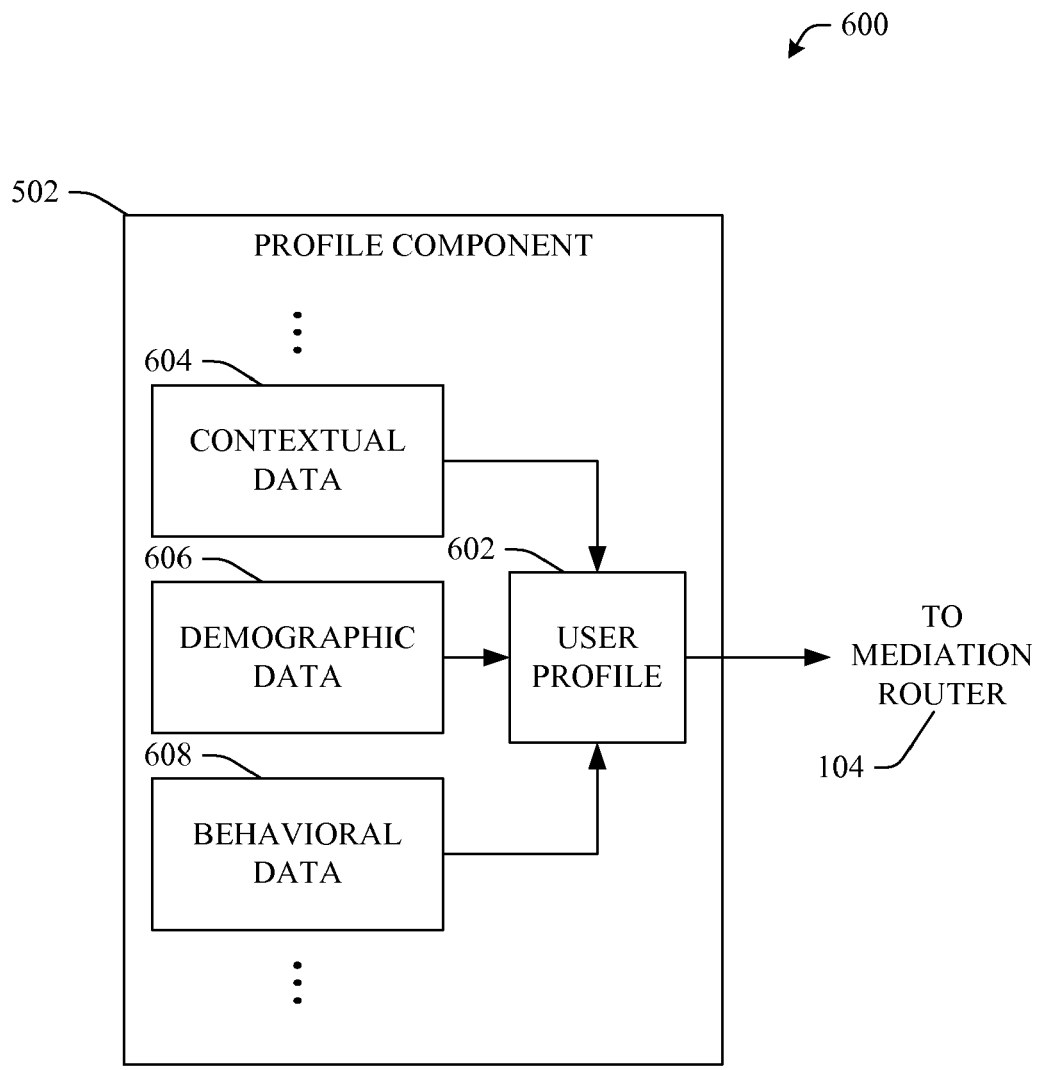
FIG. 6 illustrates a block diagram of a profile component, which can interface with a network as described in FIG. 4 and can create user profiles in accordance with an aspect of the disclosed subject matter.

Referring now to FIG. 6, there illustrated is a block diagram 600 of a profile component 502 that can be employed to create and/or store user profiles 602 associated with mobile device users. It can be appreciated that the vendor component 102 (and individual vendors 202), mediation router 104, and the portal component 106 (and individual portals 204) can each include their respective functionality, as more fully described herein, for example, with regard to systems 100, 200.

A user profile 602, generated by the profile component 502, can include factors such as, but not limited to, contextual data 604 (e.g., current time, current location, billing location, content), demographic data 606 (e.g., personal—age, gender, ethnicity—or household—marital status, income, position in family, children) or behavioral data 608 (e.g., purchases, product usage), which can be employed by the mediation router 104 to provide advertisements targeted to the specific user. In one aspect, the mediation router can employ a user profile 602 in selection of a vendor (202 in FIG. 2) to service an ad request from the user. Further, the mediation router 104 can send a subset of the user profile information to the selected vendor (202 in FIG. 2) along with the request. The vendor (202 in FIG. 2) can utilize the user profile information for ad selection to facilitate targeting.

As an example, the mediation router 104 can determine a user's contextual data 604 by employing the user's billing zip code. The mediation router 104 can utilize the billing zip code to determine a user's approximate geographical location and thereby determine the user's time zone and/or current time. A vendor (202 in FIG. 2) can employ this contextual data 604 to target ads to users.

In another example, the mediation router 104 can receive a user's demographic data 606 from the user's mobile provider. The user can provide the mobile provider with information from, for example, a survey the user completed about their demographic data 606. A vendor (202 in FIG. 2) can utilize this demographic data 606 to target ads to users.

In another example, the mediation router 104 can receive a user's behavioral data 608 from the user's mobile provider. The provider can track, for example, a user's purchases made from the mobile device or purchase patterns. Such tracking can be authorized by the user, for example, in agreement with the mobile provider. A vendor (202 in FIG. 2) can employ this behavioral data 608 to target ads to users. It can be appreciated that the contextual data 604, demographic data 606 and/or the behavioral data 608 can be automatically determined by employing machine learning techniques, such that the user does not have to manually enter information. Moreover, the user can authorize the mobile provider to collect and/or automatically determine user profile information based on a privacy policy or agreement.

In order to utilize user profiles 602, the mediation router 104 can be configured to comply with a mobile provider's privacy policies, including, but not limited to, data retention, data distribution and transfers, data access and data encryption. Furthermore, the mediation router 104 can disregard user data after an ad is delivered when the provider does not have prior implicit permission.

In one embodiment, a user profile 602 can be created (e.g. by the profile component 502) for customers in compliance with the mobile provider's privacy rules. Generally, a user profile 602 can contain non-personally identifiable information, including, but not limited to, year of birth, gender, household income range, ethnicity, spoken language, family position, presence of children or type of dwelling. According to an aspect, the profile component 502 can collect user related data to create user profiles 602 based on authorization from the user. Further, the mediation router 104 can pass a subset of elements from the user profile 602 to the vendor (202 in FIG. 2), which can deliver targeted ads to the mediation router 104, which, in turn, can deliver the targeted ads to the requesting user device.

As an example, the mediation router 104 can employ a customer's billing zip code, which can be sent as part of an ad request from a portal (204 in FIG. 2), to determine the user's approximate geographic location. The mediation router 104 can convert the city and state value to appropriate time of day and day of the week values and can send this information to the vendor (202 in FIG. 2) to facilitate day and time ad targeting.

In another embodiment, the mediation router 104 can keep some or all of a user profile 608 private so that the vendor (202 in FIG. 2) cannot view the information. For example, the mediation router 104 can remove an x-up-calling-line-id parameter from the WAP Header of an ad request before passing the request to the vendor component 102. Additionally, the mediation router 104 can mask a customer key received from a portal (204 in FIG. 2) in an ad request, transform the key into another form, and send a new/temporary key to a vendor (202 in FIG. 2) as the customer key in an ad request.

In another embodiment, the mediation router 104 can monitor the efficiency of its targeting process and/or user profiles 602. For example, the mediation router 104 can produce a report (e.g. by employing reporting component 404) that compares the performance (e.g., click-thru rate) of customers with targeting data to those without targeting data at an ad spot level. The mediation router 104 can also allow comparison between customers with various types of targeting data (e.g., date vs. age). Further, the mediation router 104 can customize a recording time period established for periods including, but not limited to, weeks, months, quarters or years.

Figure 7:
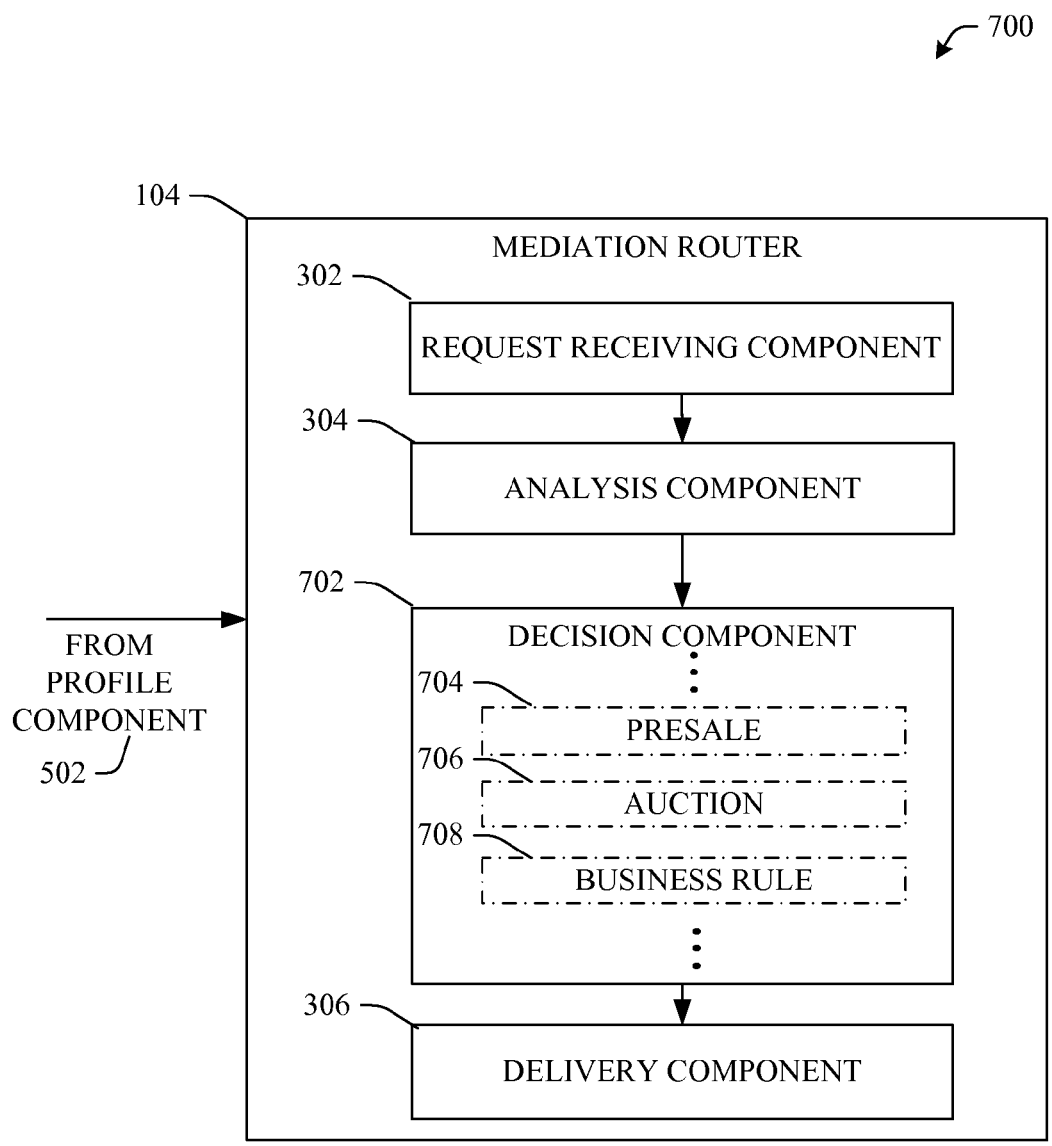
FIG. 7 illustrates a schematic block diagram of a mediation router that can receive requests for advertisements, analyze requests for advertisements and select one of a plurality of vendors to provide advertisements by utilizing decision criteria in accordance with an aspect of the disclosed subject matter.

Referring now to FIG. 7, which illustrates a schematic block diagram 700 of a mediation router 104 that can receive requests for advertisements, analyze requests for advertisements and select one of a plurality of vendors (202 in FIG. 2) to provide advertisements by employing a decision component 702 in accordance with an aspect of the disclosed subject matter. The decision component 702 can dynamically determine a plurality of vendors (202 in FIG. 2) that can be employed to receive an ad request; wherein the decision making criteria can include, but are not limited to, presale 704, auction 706, or business decision rules 708. In addition, the decision component 702 can also employ user profile data from the profile component 502 to facilitate vendor selection.

In one embodiment, the decision component 702 can determine one or more vendors (202 in FIG. 2) that can receive an ad request based on a presale criterion 704 by examining which vendor (202 in FIG. 2) has purchased presale ads. The presale criterion 704 can enable the vendor (202 in FIG. 2) to purchase a specific amount of advertisements from the service provider. For example, Vendor A can buy 1,500 ads and Vendor B can buy 2,000 ads. The decision component 702 can select between Vendor A and Vendor B based on a rotation scheme until all of the ad spots have been depleted, such that Vendor A has received 1,500 ad requests while Vendor B has received 2,000 ad requests.

Additionally or alternately, the decision component 702 can select a vendor (202 in FIG. 2) to receive an ad by performing an auction 706. For example, an ad spot can be open for a dynamic (and/or live) auction such that most any vendor (202 in FIG. 2) connected to the mediation router 104 can purchase the open ad spot. In one example, the auction results 706 can be employed in combination with the presale 704 criterion to facilitate vendor selection. In a further example, presale 704 and auction 706 ad spots can be rotated so that some ads are filled by presale 704 ads and other spots are open to dynamic auction 706.

In an embodiment, a decision component 702 can determine a vendor (202 FIG. 2) from which to request an ad employing business decision rules 708, such as, but not limited to, business rules. Business decision rules 706 can include, for example, stored distribution rates for each of the vendors (202 in FIG. 2) and each of the portals (204 in FIG. 2). The mediation router 104 can ensure that distribution rates for a given ad spot on the portal (204 in FIG. 2) do not exceed or drop below a specified threshold (e.g. 100%). For example, for Portal A, the ad request distribution to Vendor A can be 45%, while for Portal B, the ad request distribution to Vendor B can be 30%.

In a further embodiment, the decision component 702 can also distribute portal (204 in FIG. 2) calls to vendors (202 in FIG. 2) utilizing a business decision rule 708 based on a configurable number of ad request for a given portal (204 in FIG. 2) at a page (e.g., ad spot) level. For example, Vendor B can be configured to receive 1 million requests instead of a percentage of the total ad requests for a given portal (204 in FIG. 2). In one example, the decision component 702 can rotate amongst the pre-configured vendors (202 in FIG. 2) per portal (204 in FIG. 2) and per ad location/spot by utilizing an algorithm that can maintain an equitable distribution, which can be based on a pre-allocated percentage allocation. In a further embodiment, the decision component 702 can employ a business decision rule 708 to allow vendors (202 in FIG. 2) to run ad campaigns that can alter the allocation percentages per ad spot/location. Categories for potential ad campaigns include, but are not limited to, content, time, geographic or demographic profile information. These categories can be utilized, for example, if Company A wants to buy all spots available on sports pages or if Company B wants to buy all available ad space on Sunday.

In another embodiment, the decision component 702 can employ device-level business decision rules 708 to evaluate the type of ad to request from a vendor (202 in FIG. 2) utilizing device-specific parameters (for example, provided by a profile component 508). Based on a provider's business rule or a user-defined filter, the mediation router 104 can send device-specific parameters as part of an ad request call to a vendor (202 in FIG. 2). A delivery component 306 can, for example, stop an ad request from reaching a portal (204 in FIG. 2) when the user of the device associated with the portal (204 in FIG. 2) has employed a parental control filer or when a device cannot accommodate a certain ad format that is received from the vendor (202 in FIG. 2). Typically, a business decision rule 708 can enable the mediation router 104 to turn-off the requesting portal (204 in FIG. 2). Thereby the requesting portal (204 in FIG. 2) will not receive an ad, despite its request, because the vendor (204 in FIG. 2) has returned an ad that does not adhere to at least one of the business rules or the device-level business decision rules 708. In one example, when a device does not provide a device-level business decision rule 708, the mediation router 104 can request and send a default, medium-sized, non device-targeted graphic ad. Alternately, when a device provides the mediation router 104 with device-level business decision rules, the mediation router 104 can send a corresponding request to the vendor (202 in FIG. 2). In response, the vendor (202 in FIG. 2) can return an ad, which corresponds to the business decision rules 708, to the mediation router 104. It can be appreciated that, when a non-compliant ad is sent by the vendor (202 in FIG. 2), the mediation router 104 can ignore/drop the ad and can count against the vendor's (202 in FIG. 2) percentage allocation.

Figure 8:
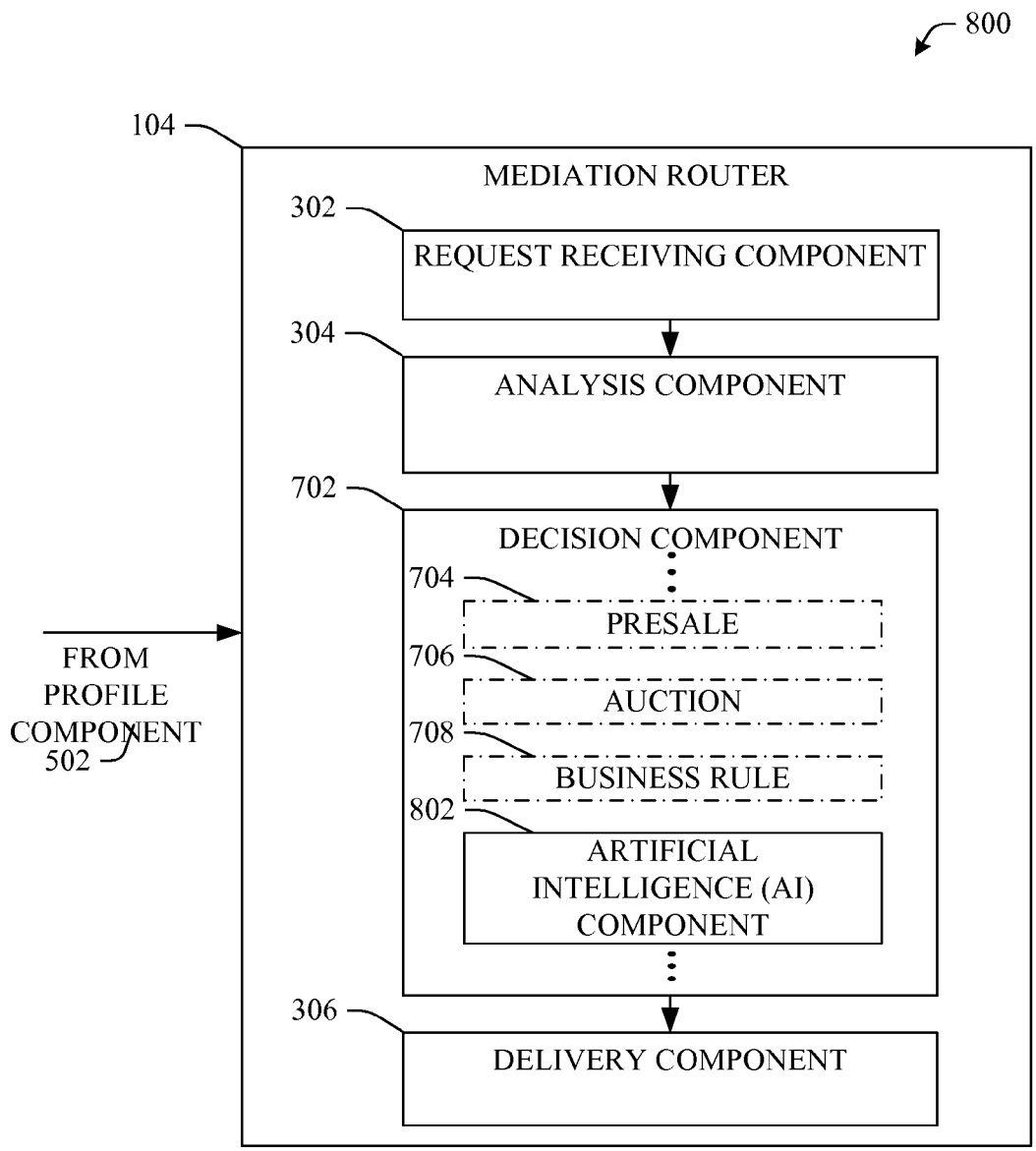
FIG. 8 illustrates an example system that can receive requests for advertisements, analyze requests for advertisements and select one of a plurality of vendors to deliver an advertisement to a mobile device based in part on artificial intelligence in accordance with an aspect of the disclosed subject matter.

Referring now to FIG. 8, which illustrates an example system 800 that can receive requests for advertisements, analyze requests for advertisements and select one of a plurality of vendors (202 in FIG. 2) to dynamically provide advertisements based at least in part on artificial intelligence (AI) in accordance with an aspect of the disclosed subject matter. Moreover, the mediation router 104 can include an AI component 802, which facilitates automating one or more features of selecting a vendor (202 in FIG. 2) to deliver a mobile advertisement to a portal (204 in FIG. 2).

The mediation router 104 can employ (e.g., in connection with its decision component 702) various AI-based schemes for carrying out various aspects thereof. For example, a process for determining which vendor (202 in FIG. 2) is selected to provide an advertisement to the requesting portal (204 in FIG. 2) can be facilitated via an automatic classifier system and process.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed. In the case of mediation routers 104, for example, attributes can be data-specific attributes associated with user or device profiles, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria selection of a vendor (202 in FIG. 2) to deliver the mobile advertisement to the requesting portal (204 in FIG. 2). It can be appreciated that although the AI component 802 is illustrated as part of the decision component 702, the AI component can also be connected remotely to system 800.

Figure 9:
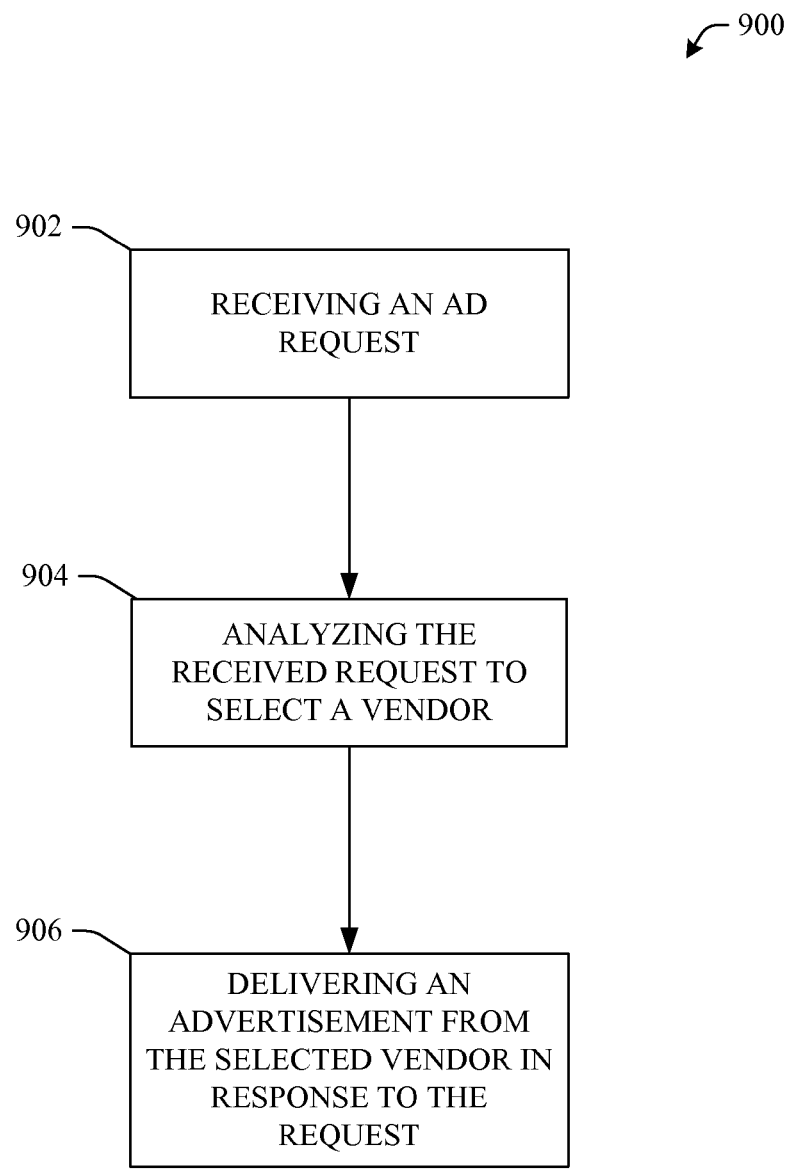
FIG. 9 illustrates an example methodology that a mediation router may employ to distribute ad requests, according to an aspect to the subject disclosure.
Figure 10:
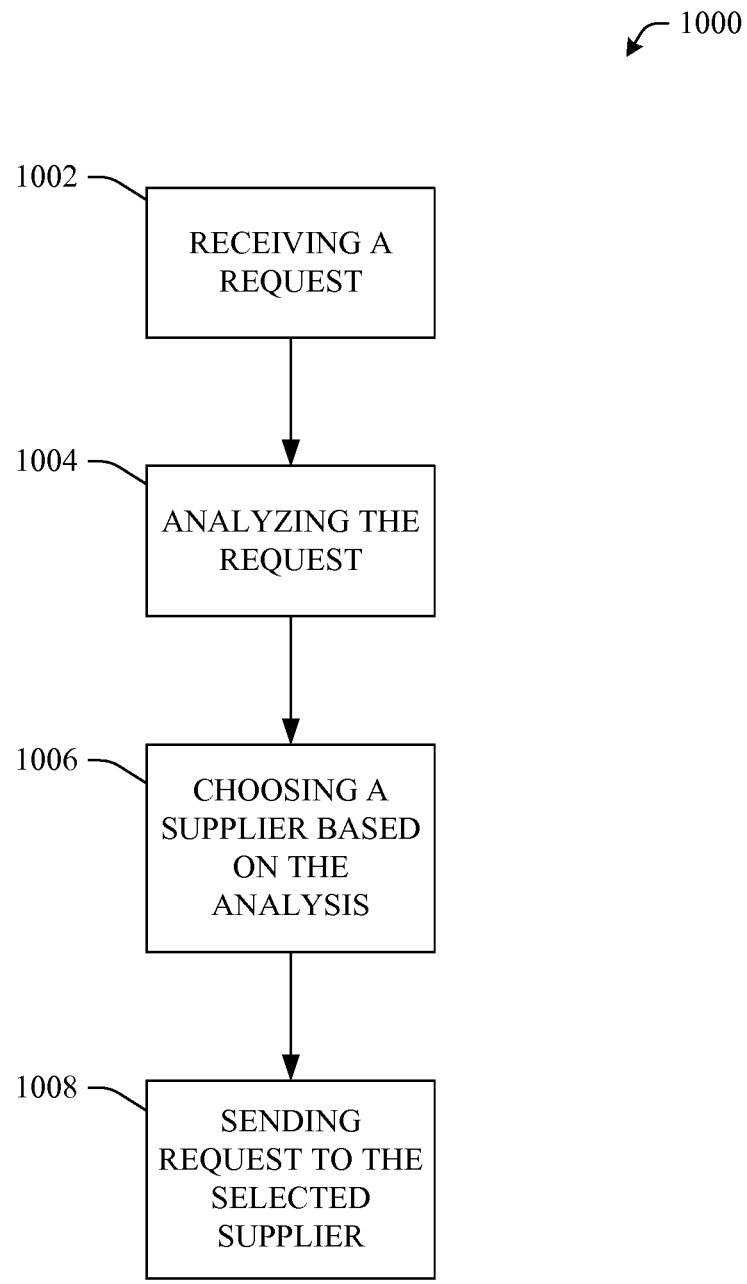
FIG. 10 illustrates an example methodology 1000 that can be employed to select one or more vendors that can service an ad request in accordance with an aspect of the subject specification.
Figure 11:
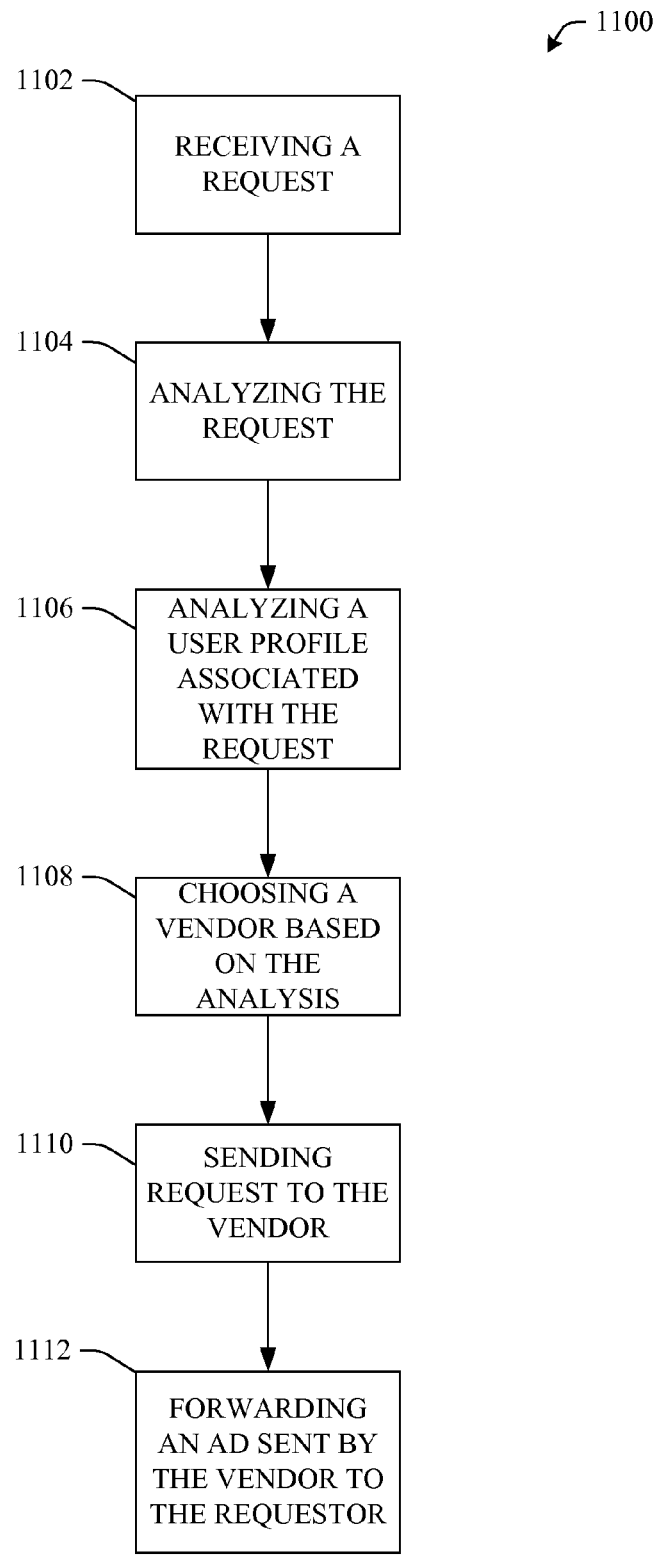
FIG. 11 illustrates an example method that a mediation router may employ to distribute ad requests.

FIGS. 9, 10 and 11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media. Further, it can be appreciated that the order of acts shown is but one example, and the order of various acts shown can be interchanged or combined with other acts not shown, without departing from the scope of the present invention Referring now to FIG. 9, which illustrates an example methodology 900 that can be employed to distribute ad requests, according to an aspect of the subject disclosure. At 902, a request for a mobile advertisement can be received, for example, from a portal on a mobile device. In one example, the request can include a subscriber-id (SUB_ID) number of the mobile device and can further include device related data, such as, but not limited to, user preferences and/or device preferences.

At 904, the request can be analyzed in order to select a vendor that can service the request. Typically, the analysis can include, for example, applying one or more business decision rules, presale criteria and/or auction results to determine one or more vendors that can service the request. Moreover, the request can be forwarded to the selected vendor. Further, in one aspect, the SUB_ID of the mobile device can be masked and sent to the selected vendor along with user/device preferences that can be employed by the vendor during ad selection. An advertisement sent by the selected vendor in response to the request can be received. At 906, the advertisement can be delivered to the requesting entity, for example, the portal on the mobile device.

Referring now to FIG. 10, which illustrates an example methodology 1000 that can be employed to select one or more vendors that can service an ad request in accordance with an aspect of the subject specification. At 1002, a request for a mobile advertisement can be received from a portal on a mobile device. The mobile device can include but is not limited to most any portable electronic device, such as a cellular phone, PDA (personal digital assistant), a gaming console, a laptop, etc.

At 1004, the received request can be analyzed based in part on at least one of business rules, presale criteria, auction results, machine learning techniques, and the like. According to one aspect, the analysis can employ a selection technique that can increase and/or maximize profit. At 1006, a supplier (vendor) can be chosen to service the request based in part on the analysis. In one example, one or more secondary vendors can also be chosen, based on the analysis, to provide a backfill ad in case the selected supplier fails to service the request. At 1008, the ad request can be forwarded to the selected supplier. In addition, data associated with user and/or device preferences can also be sent to the supplier to facilitate ad selection. Moreover, when the selected supplier fails to respond with an ad within a predefined time period, or does not service the request appropriately, a request can be sent to the one or more secondary vendors in parallel and the ad supplied by the one or more secondary vendors can be forwarded back to the requesting portal.

Referring now to FIG. 11, which illustrates an example methodology 1100 that can be employed to dynamically select one or more vendors and supply an ad received from the selected vendors to a requesting portal, according to an aspect of the subject disclosure. At 1102, an ad request can be from a portal on a mobile device. Typically, a portal can send a request for an ad specific to an application on the mobile device along with preferences (user or device) for the ad. For example, an application on a mobile device can request a full screen advertisement that can be displayed on the screen while or before the application loads, or a disparate application can request a banner advertisement that can appear in a box of a certain size, at a certain location on the screen of the mobile device. According to an example, a set of predefined rules can be received (e.g. from the portal) along with or prior to sending the ad request. Moreover, the predefined rules can include, for example, preferences to receive an ad, such as, ad size, format, and or filter specifications, like parental controls. Additionally, a user's SUB_ID can also be received in the request.

At 1104, the request from the portal can be analyzed. According to an aspect, the received rules can also be employed during analysis. In particular, during the analysis, business decision rules, presale criteria, auction results, user preferences, device preference, and the like can be employed. At 1106, a user profile associated with the requesting device can be analyzed. The user profile can include non-personally identifying information about the user of a mobile device that is requesting an ad. The user profile can also include information about the mobile device. This information can be employed for targeted advertisements.

At 1108, a vendor can be chosen to supply an ad to service the request from the portal based in part on the analysis. Further, vendor selection can also be based on profit optimization. In one aspect, one or more secondary vendors can also be chosen based on the analysis to backfill an ad if the primary vendor fails to supply an ad within a certain amount of time. At 1110, the ad request can be sent to the chosen ad vendor. Additionally, data associated with the user profile and/or predefined rules can also be sent to the selected vendor. The selected vendor can employ the additional information to select an appropriate ad for the request. It can be appreciated that a subset of the additional information can be masked and sent to the vendor. For example, a temporary id number can be sent instead of the user's SUB_ID. According to an aspect, when the chosen ad vendor does not respond with an ad within a certain time period, a request can be sent to the one or more secondary vendors in parallel to receive a backfill ad. Further, when the primary chosen ad vendor does not respond with an ad within a maximum wait time, then the ad supplied by the secondary vendor can be employed.

At 1112, the mediation router can forward the ad received from the selected vendor to the requesting portal. In one aspect, the ad received from the selected vendor can be verified based on user, device preferences and/or predefined rules prior to forwarding the ad to the requesting portal. For example, when parental controls are activated; the ads received from the selected vendor can be checked for offensive content. Accordingly, if offensive content is found in the received ad, the ad can be blocked and the vendor can be reported.

Figure 12:
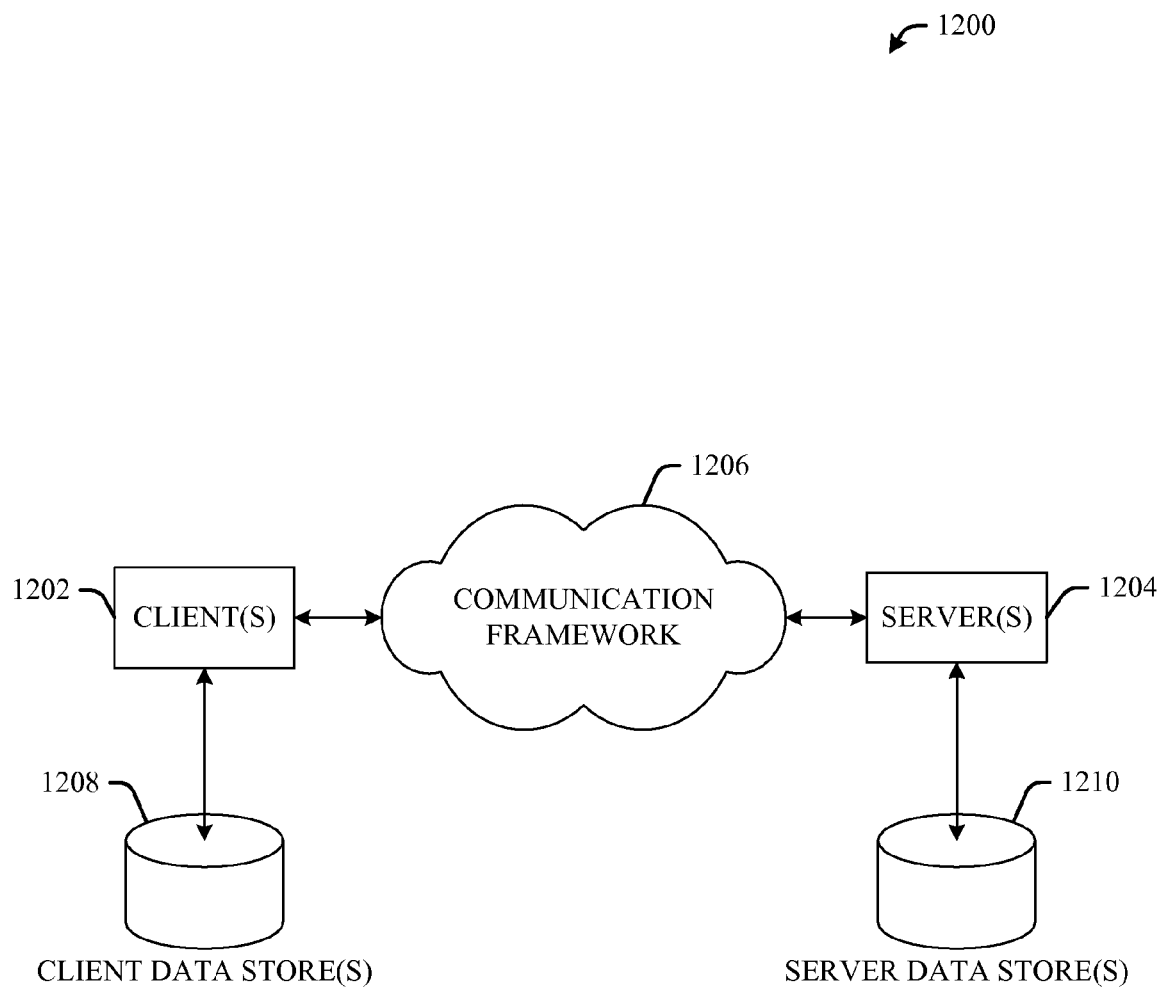
FIG. 12 illustrates a schematic block diagram of a computing environment in accordance with the subject specification.

Referring now to FIG. 12, there is illustrated a schematic block diagram of a computing environment 1200 in accordance with the subject specification. The system 1200 includes one or more client(s) 1202. The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

Figure 13:
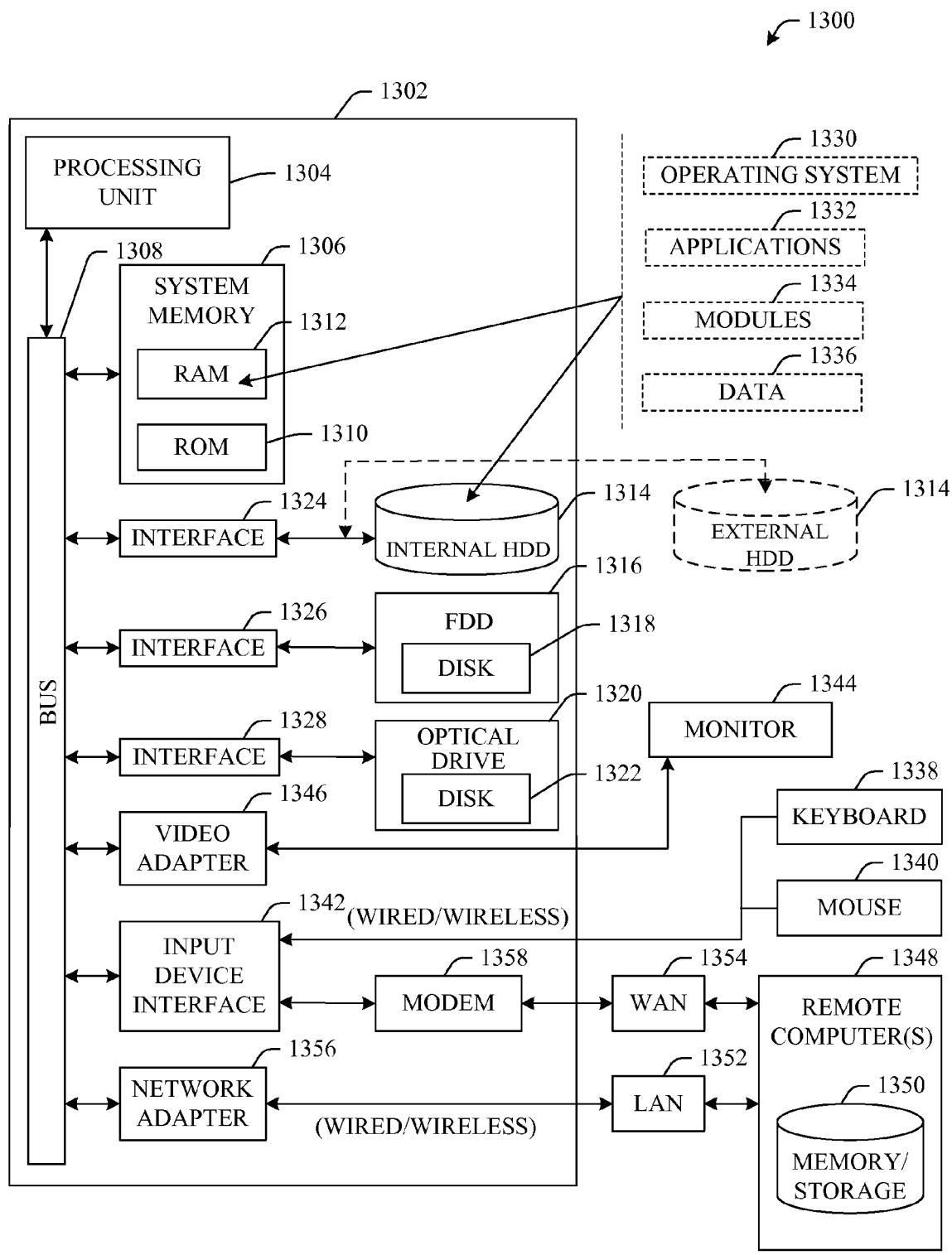
FIG. 13 illustrates a block diagram of a computer operable to execute the disclosed architecture.

Referring now to FIG. 13, there is illustrated a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the example environment 1200 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus utilizing any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1312, including an operating system 1330, one or more application programs 13332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1302 may operate in a networked environment utilizing logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1254, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 130. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store computer executable instructions; and
a processor communicatively coupled to the memory that facilitates execution of the computer-executable instructions to perform operations, comprising:
selecting, by a mediation server communicatively coupled to a plurality of vendor devices that are operable to provide advertisements for display on a mobile communication device, a first vendor device of the plurality of vendor devices to service a request for advertisement data representing an advertisement of the advertisements based on an analysis of the request,
selecting a second vendor device of the plurality of vendor devices to service a backfill request for the advertisement data, wherein the selecting the second vendor device is in response to determining that the second vendor device satisfies a loop-back acknowledgement criterion associated with a reception of acknowledgement data indicative of the advertisement data being delivered to the mobile communication device,
facilitating a first transmission of the backfill request to the second vendor device concurrently with a second transmission of the request to the first vendor device, and
directing backfill advertisement data representing a backfill advertisement received from the second vendor device to the mobile communication device in response to determining that the first vendor device has failed to deliver the advertisement within a specified time period.

2. The system of claim 1, wherein the operations further comprise:
receiving the request for the advertisement data from the mobile communication device.

3. The system of claim 1, wherein the operations further comprise:
directing, to the second vendor device, the acknowledgement data indicative of receipt of the backfill advertisement data by the mobile communication device.

4. The system of claim 1, wherein the operations further comprise:
directing the advertisement data received from the first vendor device to the mobile communication device, in response to receipt of the advertisement data from the first vendor device within the specified time period.

5. The system of claim 1, wherein the operations further comprise:
logging progress of the request for the advertisement data via the mediation server; and
determining report data based on log data from the logging.

6. The system of claim 1, wherein the backfill advertisement data is not counted against a number of the advertisements that the second vendor device is allowed to transmit to the mobile communication device.

7. The system of claim 1, wherein the facilitating the first transmission includes directing, to the second vendor device, a backfill parameter that differentiates the backfill request from the request.

8. The system of claim 3, wherein the acknowledgement data includes priority data associated with the backfill request.

9. A method, comprising:
directing, by a system comprising a processor, a request for advertisement data representing an advertisement for display on a mobile communication device that is received from a user equipment, wherein the directing includes directing the request to a first vendor device;
concurrently with the directing the request, directing, by the system, a backfill request to a second vendor device, in response to verifying that the second vendor device satisfies a loop-back acknowledgement criterion associated with a reception of acknowledgement data indicative of the advertisement data being delivered to the mobile communication device; and
sending, by the system, backfill advertisement data representing a backfill advertisement received from the second vendor device to the user equipment, in response to determining that the first vendor device has failed to deliver the advertisement data within a specified time period.

10. The method of claim 9, further comprising:
directing, by the system, the acknowledgement data to the second vendor device, wherein the acknowledgement data includes timing data associated with the backfill request.

11. The method of claim 10, further comprising:
determining, by the system, that the user equipment satisfies the loop-back acknowledgement criterion; and
receiving, by the system, receipt data indicative of receipt of the backfill advertisement data by the user equipment,
wherein the directing is in response to the receiving the receipt data.

12. The method of claim 9, further comprising:
determining, by the system, that the user equipment does not satisfy the loop-back acknowledgement criterion,
wherein the directing is in response to the sending.

13. The method of claim 10, wherein the directing includes directing classification data relating to the backfill advertisement data to the second vendor device.

14. A tangible computer readable medium comprising computer-executable instructions that, in response to execution, cause a system comprising a processor to perform operations, comprising:
in response to receiving a request for advertisement data representing an advertisement from a user equipment, concurrently sending a first request for the advertisement data to a first vendor device and a second request for backfill advertisement data representing a backfill advertisement to a second vendor device, wherein the second vendor device is selected based on verifying that the second vendor device satisfies a loop-back acknowledgement criterion associated with a reception of acknowledgement data indicative of the advertisement data being delivered to the mobile communication device; and
facilitating a transmission of the backfill advertisement data to the user equipment, in response to determining that the advertisement data has not been received from the first vendor device within a specified time period.

15. The tangible computer readable medium of claim 14, wherein the sending the second request includes sending backfill parameter data representing a backfill parameter that facilitates differentiating between the advertisement data and the backfill advertisement data.

16. The tangible computer readable medium of claim 14, wherein the second vendor device is selected based on determining that the second vendor device is authorized to receive the acknowledgment data.

17. The tangible computer readable medium of claim 16, wherein the acknowledgment data includes timing data associated with the backfill advertisement data.

18. The tangible computer readable medium of claim 16, wherein the acknowledgment data includes timing data associated with the second request.

19. The tangible computer readable medium of claim 16, wherein the acknowledgment data includes priority data associated with the second vendor device.

20. The tangible computer readable medium of claim 14, wherein the acknowledgment data includes classification data associated with the backfill advertisement data.

* * * * *